March 31, 1953
W. NIEUWENHUIS
2,633,337
ELECTRIC STOCK GUARD
Filed April 10, 1952
2 SHEETS—SHEET 1
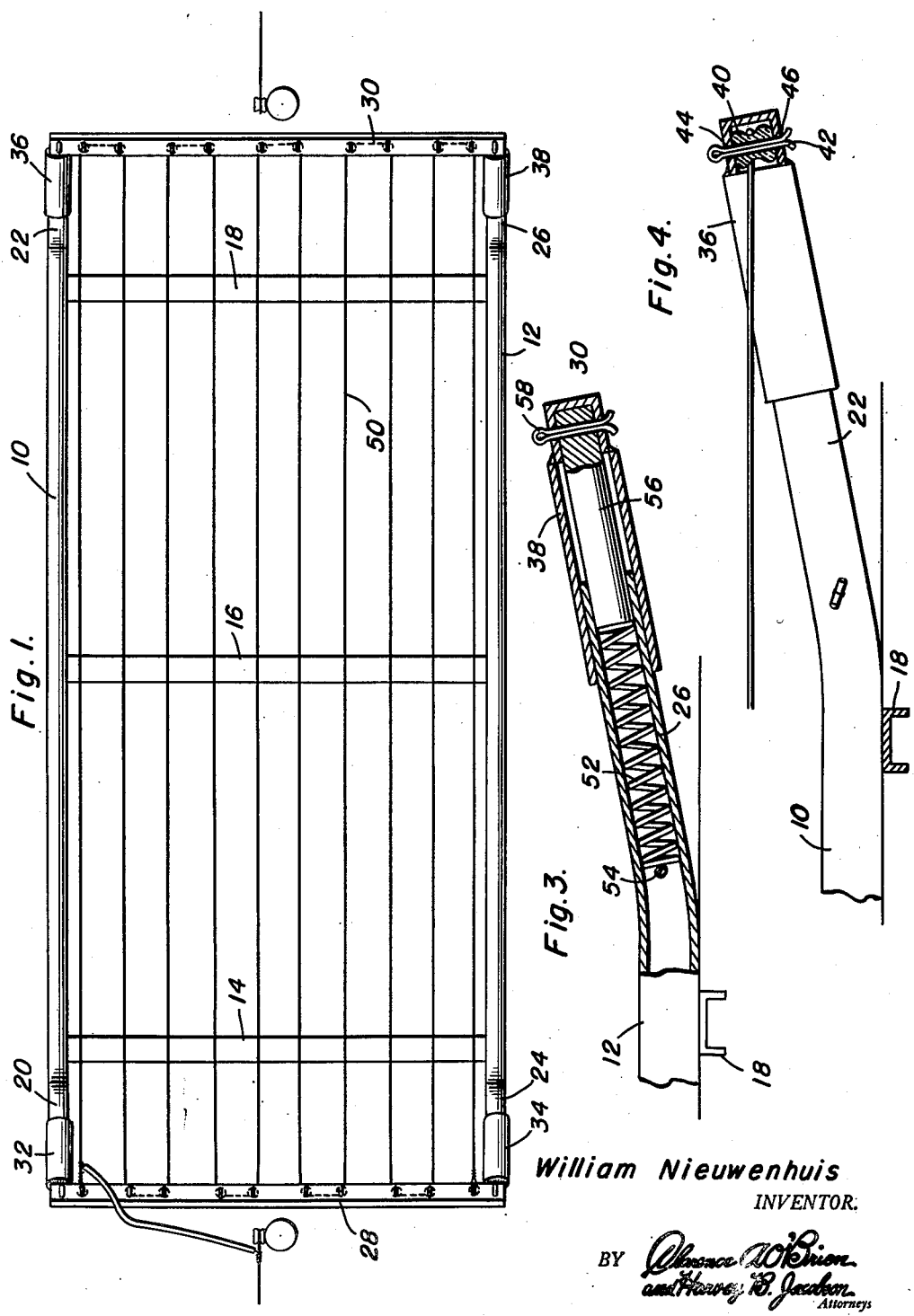
William Nieuwenhuis
INVENTOR.

March 31, 1953  W. NIEUWENHUIS  2,633,337
ELECTRIC STOCK GUARD
Filed April 10, 1952  2 SHEETS—SHEET 2
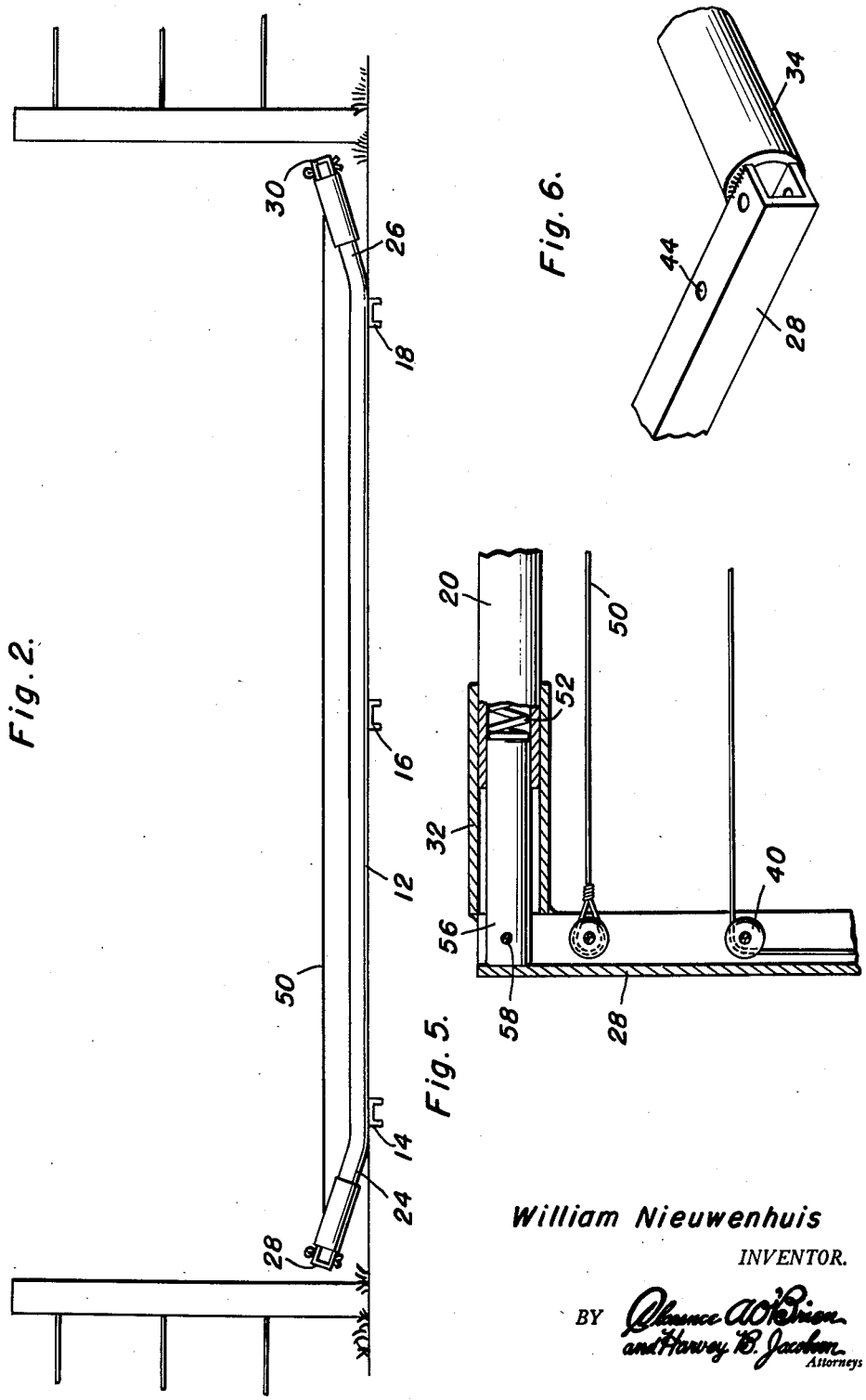
William Nieuwenhuis
INVENTOR.

Patented Mar. 31, 1953

2,633,337

UNITED STATES PATENT OFFICE 2,633,337

ELECTRIC STOCK GUARD

William Nieuwenhuis, Hospers, Iowa

Application April 10, 1952, Serial No. 281,493

2 Claims. (Cl. 256—10)

This invention relates to an electric stock guard and particularly to a guard in the form of a gate for permitting the passage of vehicles or other devices while substantially preventing the passage of livestock therethrough.

In the management of livestock on present day farms, it is customary to use so-called electric fences to separate the farm into stock grazing areas. In order to maintain the farming operations it is generally necessary to traverse through the grazing areas and for this reason so-called gates have been installed in the electric fences.

However, it is necessary to stop the tractor or other vehicles when you approach the gate and remove the gate before you can drive through it. This consumes an appreciable amount of time and is of considerable annoyance. Likewise, it is possible that the tractor operator may fail to see that the gate is in position and drive into it thereby disabling the entire fence.

The present invention provides for such gateways by providing a horizontal member which may be readily driven over by tractors or other farm implements but which will be in position to maintain a charged wire so that any livestock attempting to pass through the gate will come in contact therewith and be sufficiently shocked to retreat therefrom.

The gate according to the present invention comprises a frame which will be laid on or embedded in the ground and have upturned end portions supporting conductors preferably in the form of wires, which can be charged so that livestock coming in contact with it will be shocked and discouraged from passing through the opening.

It is therefore an object of this invention to provide an improved livestock guard.

It is a further object of this invention to provide a unitary device serving as a gate in an electric fence.

It is a further object of this invention to provide a livestock guard which may be readily moved from place to place as the fences are shifted about the farm.

It is another object of this invention to provide a livestock guard which may be readily traversed by tractors or other vehicles.

Other objects and many of the attendant advantages of this invention will be apparent from the following detailed description taken in conjunction with the accompanying drawing, in which:

Figure 1 is top plan view of the electric cattle guard;

Figure 2 is a front elevation of the cattle guard;

Figure 3 is an enlarged longitudinal section elevation showing the end construction of the resilient side rail of the cattle guard;

Figure 4 is an enlarged cross section showing the anchoring of the guard wire;

Figure 5 is an enlarged sectional plan view of the construction; and,

Figure 6 is an enlarged perspective view of the corner of the frame.

In the exemplary embodiment of the invention a pair of tubular guide rails 10 and 12 are maintained in spaced substantially parallel relation by means of cross members 14, 16 and 18. The cross members may be attached to the rails 10 and 12 in any convenient manner but preferably by welding. The cross members 14 to 18 may be constructed of any suitable safe material but preferably are of U-shaped or channel cross section so that they may be readily sunk into the ground or other material of the roadway and maintain the guard in position in the gateway.

The end portions 20 and 22 of the side rail 10 and the end portions 24 and 26 are angularly disposed with respect to the mid-portions of the rails 10 and 12 so that the extreme ends of the portions 20 to 26 are maintained out of alignment with the plane of the mid-portions of the rails 10 and 12.

End bars 28 and 30 preferably of U-shaped channel-shaped cross section are provided for the ends of the frame and are loosely connected thereto by means of guide members 32 and 34 for the member 28 and guide members 36 and 38 for the end bar 30. Guide members 32 and 34 are substantially tubular in construction and are rigidly connected to the end bar 28 by any suitable means such as welding. Guide members 32 and 34 are telescopingly received over the ends 20 and 24 of the side rails 10 and 12 so that the end bar 28 may be longitudinally adjusted with respect to the rails 10 and 12. Likewise, the end bar 30 has its guide members 36 and 38 telescopingly received on the ends 22 and 26 of the rails 10 and 12 so that the end bar 30 may be longitudinally moved with respect to the rails 10 and 12.

A plurality of spool-type insulators 40 are mounted in each of the end bars 28 and 30 preferably by means of fasteners such as the cotter pins 42 which extend through openings 44 and 46 in the end bars 28 and 30. Electrical connectors such as bare wires 50 are secured on the insulators 40 and extend longitudinally of the guard preferably substantially parallel thereto but spaced above the side rails 10 and 12. As shown, the wire 50 is a continuous member and is connected to one of the insulators 40 on the end bar 28 and extends to another insulator 40 on the end bar 30 thence laterally to a second insulator on the end bar 30 and back to a second insulator on the end bar 28. In this manner, the wires are substantially parallel to each other and spaced apart by being entrained over alternate pairs of insulators to provide a network spaced above the bottom of the frame and above the roadway. A charge is placed on the wire 50 by any suitable means such as a so-called electric fence so that any person or animal coming in contact with the conductor 50 will receive a serious electric shock which ordinarily causes stock or other animals to hastily retreat therefrom.

In order to maintain the wire 50 in top condition springs 52 are mounted in each of the upturned ends 32 to 38 which are preferably maintained in position by fastening means such as cotter pins 54. The spring follower 56 is secured to the end bars 28 or 30 by means of suitable fasteners such as the cotter key 58 preferably extends actually within the guide member to contact the end of the spring 52.

In operation, the gate or guard member is placed across the opening to be controlled and preferably the cross members 14 to 18 are embedded in the ground or other material of the roadway so that there will be no danger of the guard being displaced from its location. A wire 50 is maintained taut by means of the springs 52 urging the end members away from the side rails 10 and 12 so that the wire will be maintained in spaced parallel relation to the roadway. The wire will be charged by any suitable device or may be connected directly to the electric fence so that any animals that attempted to cross the guard will be shocked and caused to retreat therefrom. However, tractors, or other equipment which move across the gate will flex the wires 50 into contact with the frame or enter contact with the ground so the wires will be rendered impotent to produce any charging action.

It will thus be seen that this invention provides a cattle guard which substantially prevents the passage of animals through the gateway while permitting ready use and access through the gateway by means of a tractor or other vehicles which desire to go through. For purposes of exemplification a particular embodiment of the invention has been shown, and described according to the best present understanding thereof.

However, it will be apparent to those skilled in the art that many changes and modifications can be made therein without departing from the true spirit of the invention.

Having described the invention, what is claimed as new is:

1. An electric gate comprising a pair of tubular side rails, a plurality of cross members, said cross members rigidly maintaining said side rails in spaced relation, the ends of said rails being angularly upturned, out of the plane of the central portion of the side rails, end bars, tubular guides mounted on said end bars, said guides being telescopically mounted on said upturned ends, a spring mounted in each of said ends, said springs yieldingly urging said end bars outwardly from said rails, insulators mounted on said end rails, wires secured on said insulators and extending between said end bars, said springs maintaining said wires under tension.

2. In an electric gate, a frame assembly comprising a pair of spaced apart parallel side rails, said side rails being tubular, channel-shaped end members supported in spaced relation to the ends of said side rails, supporting means between said end members and said side rails, each of said means including a cylindrical member slidably engaging the outer surface of the end of said side rail, said cylindrical member being rigidly attached to said end member, a piston-like member slidably received within said tubular side rail, said piston-like member being secured to said end member within said cylindrical member, a stop in said side rail, a compression spring interposed between said stop and said piston-like member.

WILLIAM NIEUWENHUIS.

REFERENCES CITED

The following references are of record in the file of this patent:

UNITED STATES PATENTS

| Number | Name | Date |
|---|---|---|
| 2,512,740 | Evans | June 27, 1950 |
| 2,546,429 | Carr | Mar. 27, 1951 |
| 2,555,180 | Adkins | May 29, 1951 |